April 16, 1968  P. J. KERSTEN  3,378,049
APPARATUS FOR SLITTING AND PITTING DATES
Filed May 10, 1965  3 Sheets-Sheet 1
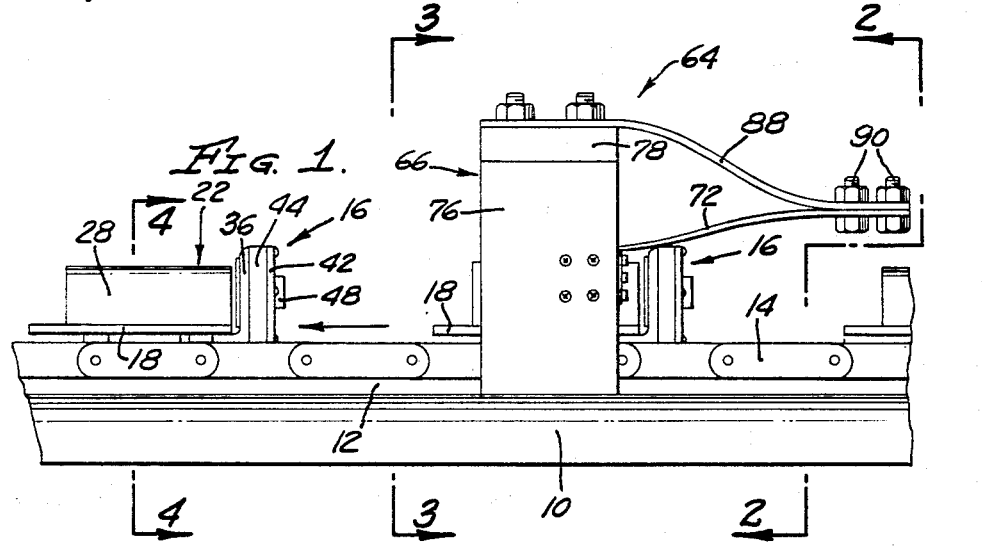
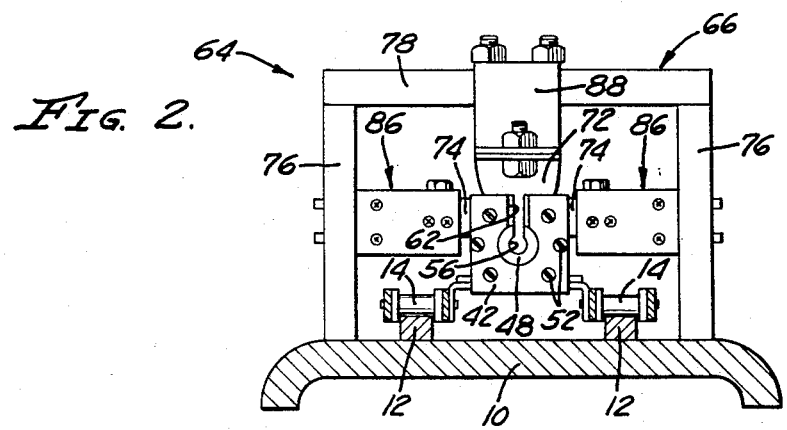
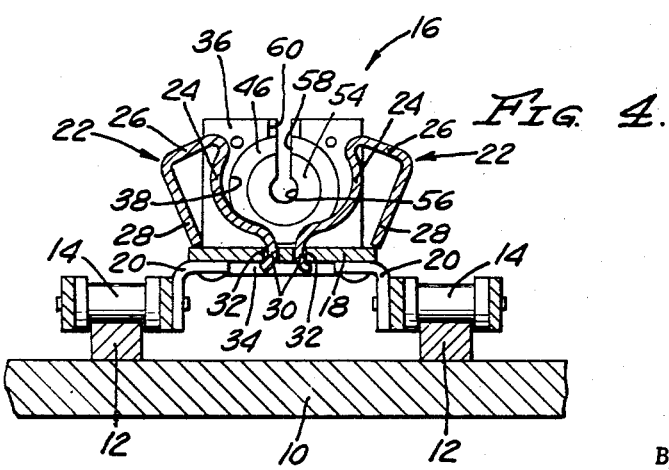
INVENTOR.
PAUL J. KERSTEN
BY Herbert E. Kidder
AGENT

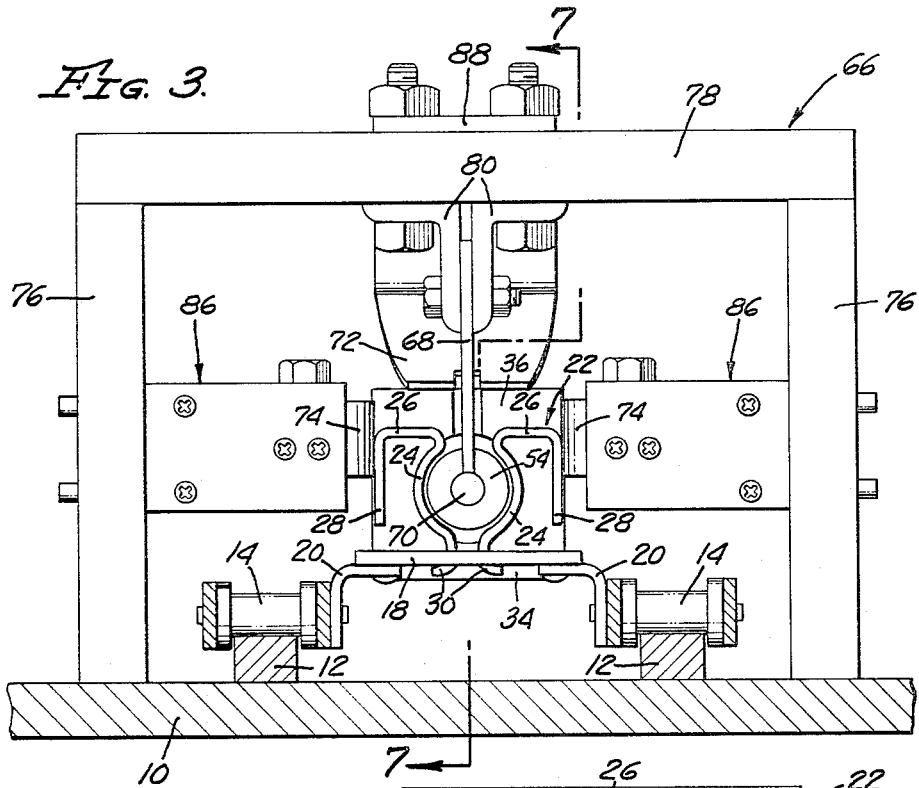
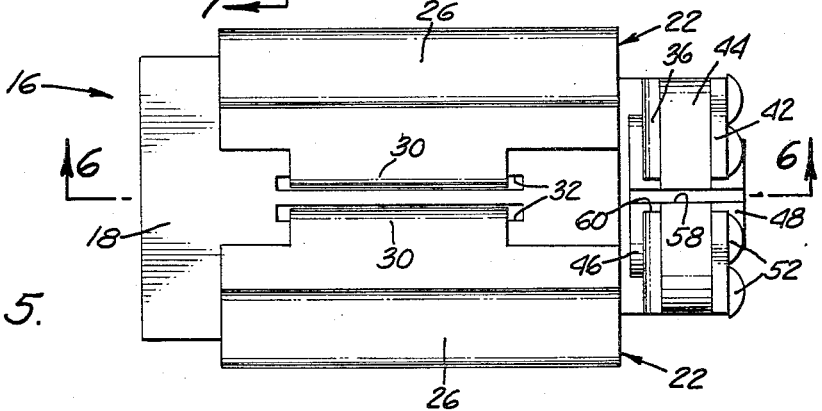
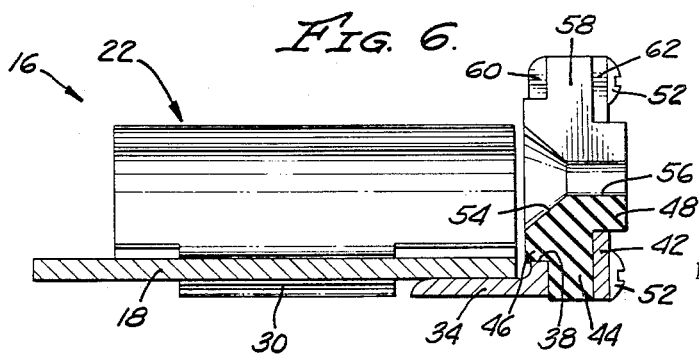

INVENTOR.
PAUL J. KERSTEN
BY Herbert E. Kidder
AGENT 3,378,049
APPARATUS FOR SLITTING AND PITTING DATES
Paul J. Kersten, 39-580 Kersten Road, Indio, Calif. 92201
Filed May 10, 1965, Ser. No. 454,750
4 Claims. (Cl. 146—17)

The present invention relates to fruit pitting machines, and more particularly to a machine for slitting and pitting dates. Dates are difficult to pit because of their sticky nature, and present pitters are expensive machines that operate at relatively slow speed, and are subject to frequent stoppage owing to the accumulation of sticky date material on the pit-ejecting mechanism.

The primary object of the present invention is to provide a new and improved machine for longitudinally slitting dates and pitting the same in one operation. Dates that have been thus slit and pitted are particularly convenient for stuffing with nut meats or other fillings, and there is a large and growing market for such dates.

Another object of the invention is to provide a machine for slitting and pitting dates, which is relatively simple and inexpensive to manufacture, reliable in operation, and which slits and pits the dates at a much faster rate than any other machine presently on the market.

A further object of the invention is to provide a machine of the class described, which handles the dates gently, and performs the slitting and pitting operation with an absolute minimum of injury to the date, whereby the finished dates are attractive in appearance and clean to handle.

These and other objects and advantages of the invention will become apparent to those skilled in the art upon consideration of the following detailed description of the preferred embodiment thereof, reference being had to the accompanying drawings, wherein:

FIGURE 1 is a fragmentary elevational view of a machine embodying the principles of the invention;

FIGURE 2 is a sectional view through the same, taken at 2—2 in FIGURE 1;

FIGURE 3 is an enlarged sectional view taken at 3—3 in FIGURE 1;

FIGURE 4 is a fragmentary sectional view, to the same scale as FIGURE 3, taken at 4—4 in FIGURE 1;

FIGURE 5 is a top plan view of one of the date carriers, drawn to an enlarged scale;

FIGURE 6 is a sectional view of the same, taken at 6—6 in FIGURE 5;

Figure 7:
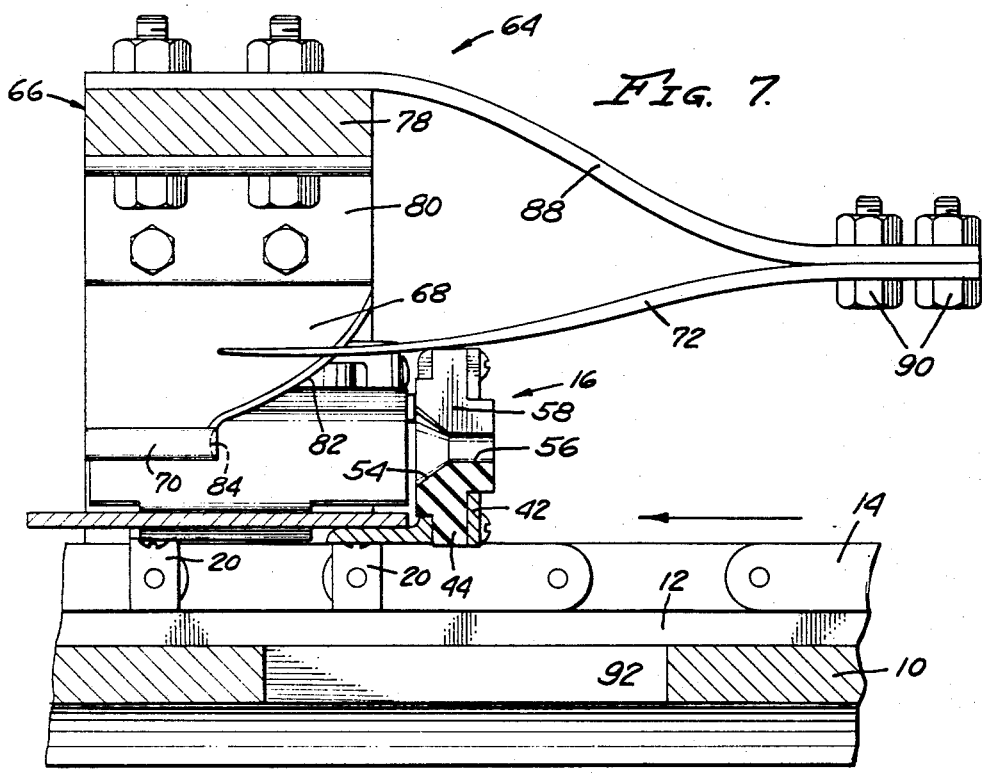
Figure 8:
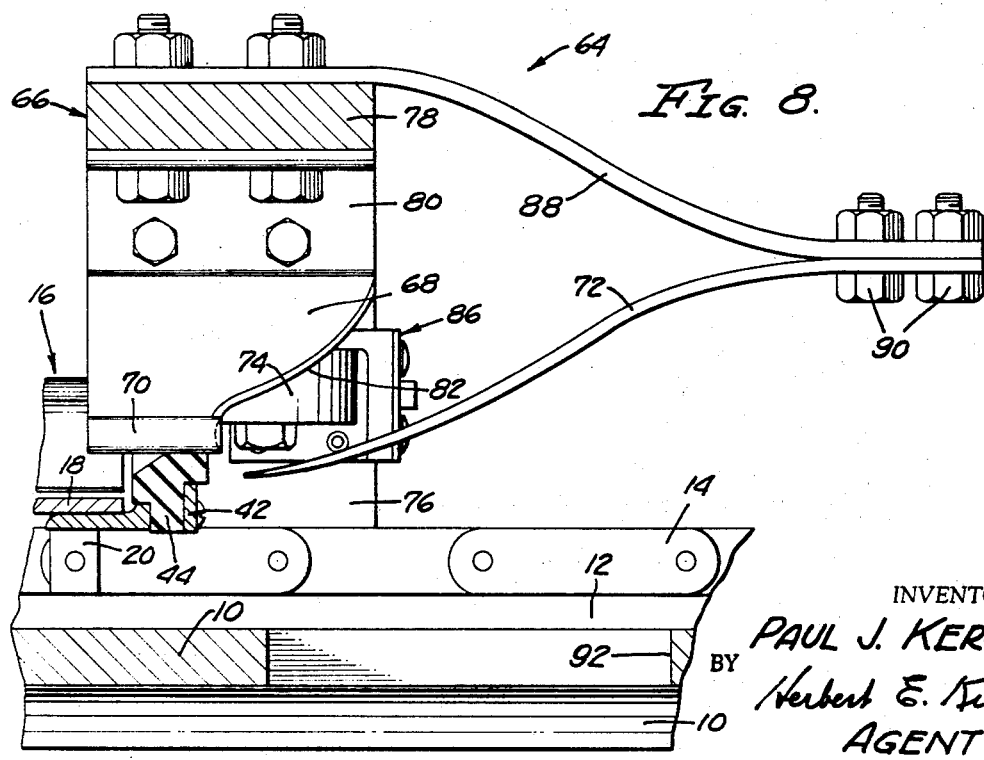

FIGURE 7 is a sectional view through the slitting and pitting unit, taken at 7—7 in FIGURE 3, showing the pit ejector riding up over the date carrier; and FIGURE 8 is a view similar to FIGURE 7, showing the date carrier a little further advanced along its line of travel, and with the pit ejector sprung down to its normal, unstressed position, after knocking the pit down from the rear end of the carrier.

In the drawings, the reference numeral 10 designates a table top, having a pair of laterally spaced tracks 12 affixed to the top side thereof. Sliding on the tracks 12 is a roller chain conveyor 14, to which date carriers 16 are attached at spaced intervals.

Each of the date carriers 16 comprises a horizontal, flat, bottom plate 18 which is attached to links of the roller chain 14 by angle brackets 20. Hinged to the bottom plate 18 for swinging movement about axes parallel to the tracks 12 are two side members 22, which are preferably formed of sheet metal to the configuration shown in FIGURES 3 and 4. It will be noted that each of the side members 22 has a cylindrically concave inner wall 24, a flat top wall 26, and a flat outside wall 28, which is perpendicular to the top wall 26. The bottom edge of the inner wall 24 is curled to form a hook 30, which is inserted down through one of two laterally spaced, parallel slots 32 in the bottom plate 18, said slots extending parallel to the line of travel. The engagement of the hooks 30 in the slots 32 provides a hinge connection, which permits the side members 22 to swing between the open position shown in FIGURE 4, and the closed position shown in FIGURE 3. In order to allow the side members 22 to swing out to the said open position, the outside walls 28 are made somewhat shorter than the inner walls 24, so that the bottom edges of walls 28 are raised up from the bottom plate 18, as shown in FIGURE 3, when the side members 22 are closed.

Mounted on the underside of the plate 18 at the trailing end of the carrier is an angle bracket 34, one flange 36 of which extends upwardly from the bottom plate transverse to the direction of forward travel. The flange 36 has a circular opening 38 formed centrally therein, and intersecting the opening 38 from the top is a narrow slot 60, which is located on the longitudinal centerline of the carrier.

Clamped to the backside of the flange 36 by a clamping plate 42 is an end piece 44 of soft, rubber-like material, such as vulcanized natural rubber or neoprene. The end piece 44 may take any desired configuration, but is herein shown as a flat block of rubber, approximately square as seen from the end, with two coaxial, cylindrical bosses 46 and 48 projecting from opposite sides thereof. The front boss 46 is received within the circular opening 38 in bracket flange 36, while the rear boss 48 is received within a corresponding circular opening 50 in clamping plate 42. The clamping plate 42 is secured to flange 36 by six screws 52.

Formed in the front face of the boss 46 is a conical cavity 54, which is centrally located with respect to the cylindrical concavities in the inner walls 24, so that when a date is held between the side members 22, its rear end will seat in the conical cavity 54. A cylindrical bore 56 extends rearwardly from the bottom of the cavity 54 to the rear face of boss 48, and this bore has a diameter approximately the same as that of an average-size date pit. Extending down into the bore 56 from the top side of the rubber end piece 44 is a narrow vertical slot 58, which is parallel to the line of forward travel and centered with respect to the carrier 16. Slot 58 is also centered with respect to slot 60 in flange 36, and clamping plate 42 has a similar slot 62 extending down from its top edge to the circular opening 50, which is likewise centered with respect to slot 58. The purpose of the slots 58, 60, 62 and bore 56 is to pass the slitting knife and pit pusher, as will be described presently.

Mounted on the table 10 and extending over the conveyor 14 is a slitting and pitting unit 64, comprising a housing 66, which supports a stationary knife blade 68, pit pusher 70, pit ejector 72, and spring-loaded rollers 74, that engage the side members 22 to close them against opposite sides of the date. The housing 66 consists of two laterally spaced, vertical side members 76 and a top member 78, the latter standing on the top ends of the members 76 and extending over the conveyor 14.

Mounted back-to-back on the underside of the top member 78 are two angle brackets 80, and the knife blade 68 is clamped between them and extends downwardly in a vertical plane parallel to the line of travel of the conveyor 14. The knife blade 68 is shown in side elevation in FIGURES 7 and 8, and is seen to have a forwardly and upwardly curved cutting edge 82, which cuts through the flesh of the date on the top side thereof as the date carrier 16 passes under the knife.

The pit pusher 70 is in the form of a cylindrical member mounted on the bottom edge of the knife 68 with its axis parallel to the line of travel of the conveyor 14. The end 84 of the cylindrical member 70 that is first engaged by the date is spherically concaved, so that it cups the end of the pit to prevent the pit from slipping off to one side. The pit pusher 70 is positioned to pass through the bore 56 in the end piece 44, and its diameter is substantially the same as the diameter of the bore 56.

Mounted on the inside surface of the side members 76 of the housing 66 are two inwardly projecting housings 86, which contain the spring-loaded supports for the rollers 74. The rollers 74 engage the side members 22 of the date carriers, and cam them closed as the carrier passes beneath the housing 66. As best shown in FIGURE 3, the rollers 74 bear against the outer walls 28 of the date carrier to press the side members 22 inwardly against opposite sides of the enclosed date. When the date carrier passes beyond the housing 66, the side members 22 are released by the rollers and open out to the position shown in FIGURE 4, so that the slit and pitted date may be removed from the carrier.

The pit ejector 72 is attached to a curved holder 88, which is mounted at one end on the top side of the housing member 78 and is secured thereto by the same bolts that hold the angle brackets 80. The holder 88 extends to the right and downwardly from the top of the housing 66, as viewed in FIGURES 1, 7, and 8, and the pit ejector 72 is secured by two bolts 90 to the other end of the holder. The pit ejector may be a simple curved leaf spring, as shown in the drawings, or it may take any other desired form. The leaf spring 72 extends downwardly and to the left from its point of attachment to the holder 88, in the same general direction as the line of travel of the date carriers. The free end of the spring 72 extends almost to the cupped end 84 of the date pit pusher 70, and is bifurcated to pass up over the leading edge of the knife blade 68 on opposite sides thereof.

As the date carrier 16 passes through the housing 66, it engages and lifts the free end of the spring 72, and the latter slides over the top surface of the vertical flange 36, end piece 44, and clamping plate 42. At the same time, the side members 22 of the date carrier are cammed inwardly by the spring-loaded rollers 74, to clamp the date firmly between them. The knife blade 68 then slits the top side of the date longitudinally down to the pit and, almost simultaneously, the cupped end 84 of the pit pusher 70 pushes its way through the leading edge of the date and engages the end of the pit. The pit is thus stopped by the pit pusher, while the date continues to travel with the carrier 16. The pit is pushed through the trailing end of the date, which is cupped in the conical cavity 54, and passes out through the cylindrical bore 56.

As the trailing end of the carrier 16 travels under the knife blade 68 and pit pusher 70, the blade passes through the slots 58, 60, 62, while the cylindrical pit pusher 70 passes through the bore 56. The pit, which is now completely out of the bore 56, sometimes tends to cling to the end of the pit pusher 70, and if it does so, it is struck down by the free end of the spring 72, which slips off the top of the carrier and springs down to the position shown in FIGURE 8. The ejected pit falls through an opening 92 in the table top 10, into a receptacle (not shown).

The slit and pitted dates are removed from the open date carriers 16 at any convenient location beyond the slitting and pitting unit 64, and the conveyor chain 14 then returns the empty carriers to a loading station, where they are refilled before going through the unit 64 again. Somewhere between the unloading station and the loading station, the carriers 16 are preferably run through a water spray (not shown), to rinse off any sticky date material adhering to them.

While I have shown and described in considerable detail what I believe to be the preferred embodiment of my invention, it will be understood by those skilled in the art that various changes may be made without departing from the broad scope of the claims that follow.

I claim:

1. A machine for slitting and pitting dates, comprising, in combination:
   a traveling conveyor;
   a plurality of date carriers mounted on said conveyor and movable therewith, each of said carriers being operable to receive and hold a date parallel to the line of travel;
   a stationary knife blade positioned to slit each of said dates longitudinally as its carrier passes by;
   each of said carriers comprising a pair of hinged sides swingable about axes extending parallel to the line of travel, said sides being swingable between an open position to receive a date and a closed position wherein said sides bear against opposite sides of the date to hold the same firmly in position;
   means for closing said sides to said closed position while said carrier is passing said stationary knife;
   stationary means positioned in the path of said date and engageable with one end of the pit after said date has been slit, said stationary means being operable to stop the pit while the date continues to travel along with said conveyor, thereby pushing the pit out of the other end of the date; and
   a holding member mounted on said carrier behind said hinged sides and extending transversely across the carrier, said member engaging the rear end of the date to hold the same against rearward movement with respect to the carrier, said member having an opening provided therein through which said stationary knife, said stationary means, and the ejected pit pass.

2. A machine for slitting and pitting dates, as set forth in claim 1, wherein said holding member engaging one end of the date comprises an end piece of soft, rubber-like material having a cavity shaped to receive the rear end of the date, said end piece having a bore extending through from front to back at the bottom of said cavity, and said end piece having a vertical slot extending down from the top side thereof to said bore, parallel to the line of travel;
   said bore constituting that portion of the opening through which the ejected pit and said stationary means passes, and said vertical slot constituting that portion of the opening through which said knife blade passes.

3. A machine for slitting and pitting dates, comprising, in combination:
   a traveling conveyor;
   a plurality of date carriers mounted on said conveyor and movable therewith, each of said carriers comprising a pair of hinged sides swingable about axes parallel to the line of travel of said conveyor, said sides being swingable between an open position to receive a date, and a closed position wherein said sides grip said date on opposite sides thereof, said sides being spaced apart at the top of the carrier when closed against a date;
   an end piece of soft, rubber-like material having a cavity on its front side shaped to receive the end of the date, said end piece having a bore extending through from front to back at the bottom of said cavity, and said end piece having a vertical slot extending down from the top side thereof to said bore, parallel to the line of travel and in line with the space between the hinged sides at the top of the carrier;
   a housing extending over said conveyor;
   a stationary knife blade mounted on the top of said housing, said knife blade being positioned to enter the space between the hinged sides of the carrier and to slit said date longitudinally as the carrier passes beneath said knife;
   a cylindrical pit pusher mounted on the bottom edge of said stationary knife blade with its longitudinal axis parallel to the line of travel of the dates, said pit pusher engaging the end of the pit and pushing it out of the other end of the date and through said bore in said end piece as said date carrier passes by; and a pair of spring-loaded rollers mounted on said housing on opposite sides of said conveyor, said rollers engaging said carrier sides to cam the same inwardly against opposite sides of the date as the carrier passes through said housing.

4. A machine for slitting and pitting dates, comprising:

a traveling conveyor;

a plurality of date carriers mounted on said conveyor and movable therewith, each of said date carriers being operable to receive and hold a date parallel to the line of travel;

each of said carriers comprising a pair of sides movable toward and away from one another between open and closed positions, said sides bearing against opposite sides of the date to hold the same firmly in position when said carrier is closed;

a stationary knife blade positioned to pass between said carrier sides and to slit each of said dates longitudinally as its carrier passes by;

means for closing said sides together as said carrier travels past said knife;

stationary means positioned in the path of said date and engageable with one end of the pit after the date has been slit, so as to push the pit out of the other end of the date; and a holding member mounted on each of said carriers to engage the rear end of the date and hold the same against rearward movement with respect to the carrier, said member having an opening therein through which said stationary knife, said stationary means and the ejected pit pass.

References Cited

UNITED STATES PATENTS

| | | | |
|---|---|---|---|
| 482,272 | 9/1892 | Philips | 146—28 |
| 1,407,524 | 2/1922 | Fourchy | 146—28 |
| 1,676,413 | 7/1928 | Plowman | 146—17 |
| 2,750,975 | 6/1956 | Vanderhoofven | 146—28 |
| 1,794,479 | 3/1931 | Smith | 146—17 X |
| 1,822,381 | 9/1931 | Smith | 146—17 |
| 1,822,382 | 9/1931 | Smith | 146—17 |

W. GRAYDON ABERCROMBIE, *Primary Examiner.*